D. McGUIRE.
Animal-Trap.
No. 199,987. Patented Feb. 5, 1878.
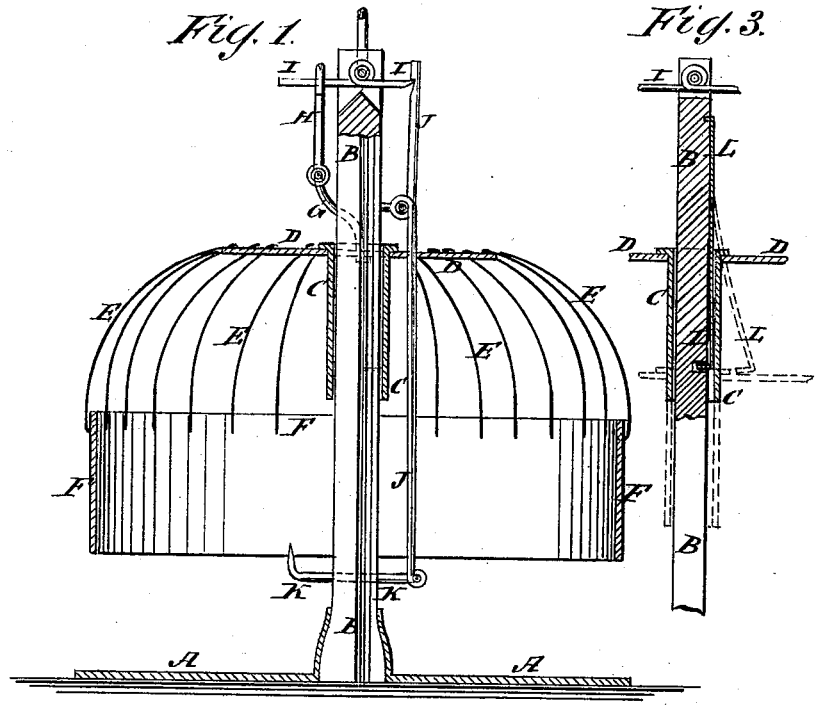
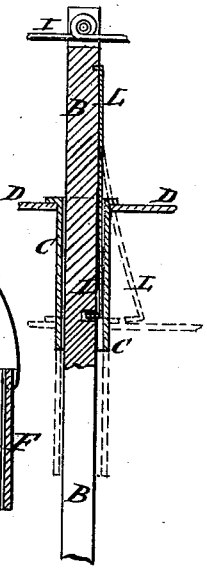
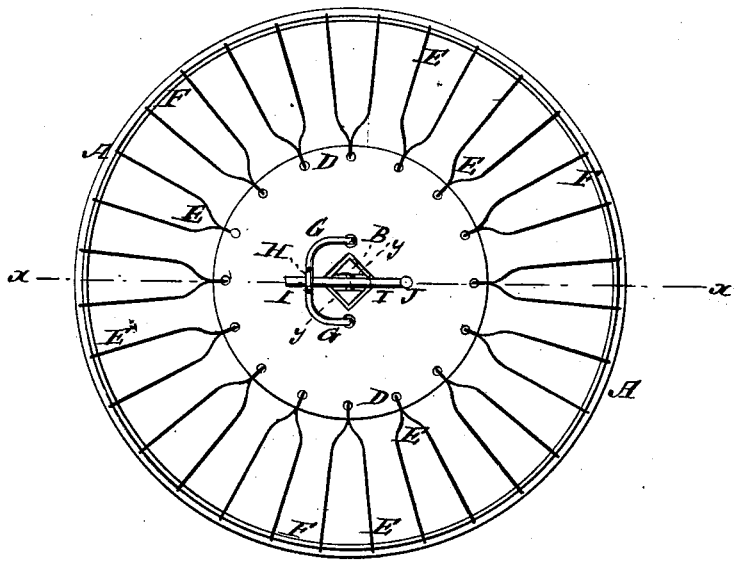
WITNESSES:
E. Wolff
J. H. Scarborough
INVENTOR:
D. McGuire
BY Munn & Co
ATTORNEYS.

UNITED STATES PATENT OFFICE.

DAVID McGUIRE, OF NEW GARDEN, MISSOURI.

IMPROVEMENT IN ANIMAL-TRAPS.

Specification forming part of Letters Patent No. 199,987, dated February 5, 1878; application filed October 20, 1877.

*To all whom it may concern:*

Be it known that I, DAVID McGUIRE, of New Garden, in the county of Ray and State of Missouri, have invented a new and useful Improvement in Animal-Traps, of which the following is a specification:

Referring to the accompanying drawings, forming part of this specification, Figure 1 is a vertical section of my improved trap, taken through the line $x\ x$, Fig. 2. Fig. 2 is a top view of the same; and Fig. 3 is a detail section taken through the line $y\ y$, Fig. 2.

Similar letters of reference indicate corresponding parts.

The object of this invention is to furnish an improved trap for catching animals, birds, and fishes, which shall be so constructed as to catch the animal without injuring it, so that it may be destroyed or kept, as may be desired, and which is simple in construction and convenient and reliable in use.

The invention will first be described in connection with the drawing, and then pointed out in the claim.

In the drawings, A represents the bottom of the trap, which may be made of metal or wood, and of any desired size, according to the size of the animal to be trapped for. To the center of the bottom A is firmly attached the lower end of a post, B, upon the upper part of which is placed a metal sleeve, C, that slides up and down upon it. To the upper end of the sleeve C is securely attached a disk, D, which forms the top of the trap, and which has a hole through its center for the passage of the post B. With the outer edge of the top D is connected the upper edge of a wire-work, E, which allows light to pass through, while preventing the escape of the animal, and the lower edge of which is connected with the upper edge of a metal band, F, of a little less diameter than the bottom A, so that when lowered its lower edge may rest upon the said bottom. To the middle part of the top D is pivoted, by a loop, G, or other convenient means, the lower end of a rod, H, which has a hook formed upon its upper end, to hook upon a rod, I. The rod I passes through and is pivoted in a slot or mortise in the upper part of the post B, and its other end, when the trap is set, engages with a notch in the side of the upper part of the rod J. The rod J is pivoted to the post B at a little distance below its upper end, and passes down through a hole in the top D, near the said post B. To the lower end of the rod J is attached the middle part of a semicircular rod, K, the arms of which project upon the opposite sides of the post B, and have hooks formed upon them to receive the bait.

L is a spring, the upper end of which is attached to the upper part of the post D, and its lower part stands out a little from the said post, as shown in dotted lines in Fig. 3. The spring L is so arranged that its lower end may be just above the top D of the trap, to prevent the cage C D E F from being raised by the animal in its efforts to escape.

In setting the trap, the bait is applied to the bait-hook K, the spring L is pressed inward, so that the sleeve C may slide over it, the cage C D E F is raised, the hook H is hooked over one end of the lever I, and the other end of said lever I is inserted in the notch in the bait-rod J. The trap is now set, and the least movement of the bait disengages the upper end of the bait-rod J from the lever I, and allows the cage C D E F to drop, inclosing the animal without injuring it.

This construction enables the trap to be used for catching animals to be kept and tamed, as well as those to be destroyed, and also prevents the injuring of domestic animals or fowls, should they accidentally get into the trap.

The trap may also be used as a cage for carrying the animal caught to the place where it is to be destroyed, transferred to another cage, or released.

Having thus described my invention, I claim as new and desire to secure by Letters Patent—

The combination, with post-cage D E F and sleeve C, of the pivoted hook-rod H, pivoted rods I J, the hook-rod K, having arms projecting upon opposite sides of post, and the spring L, for the purpose set forth.

DAVID McGUIRE.

Witnesses:
JNO. L. ISLEY,
A. C. DONOVEN.